(12) United States Patent
Venkatachalam

(10) Patent No.: US 7,725,115 B2
(45) Date of Patent: May 25, 2010

(54) PAGING OPERATION FOR IDLE MODE TERMINALS WITH A PLURALITY OF WIRELESS INTERFACES

(75) Inventor: Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 902 days.

(21) Appl. No.: 11/488,814

(22) Filed: Jul. 17, 2006

(65) Prior Publication Data

US 2008/0014921 A1    Jan. 17, 2008

(51) Int. Cl.
*H04W 68/00*    (2009.01)

(52) U.S. Cl. .................. 455/458; 455/428; 455/440; 370/331

(58) Field of Classification Search .......... 455/458, 455/428, 432.1–432.3, 435.1–435.2, 550.1–553.1, 455/556.1, 462.1, 575.1, 334; 370/310, 328, 370/331–332, 334
See application file for complete search history.

(56) References Cited

U.S. PATENT DOCUMENTS

| | | | |
|---|---|---|---|
| 6,826,400 B1* | 11/2004 | Cashman et al. | 455/434 |
| 2004/0248574 A1* | 12/2004 | Watanabe et al. | 455/435.1 |
| 2005/0238041 A1* | 10/2005 | Hsu et al. | 370/441 |
| 2005/0288054 A1* | 12/2005 | Sakaniwa | 455/550.1 |
| 2007/0019584 A1* | 1/2007 | Qi et al. | 370/331 |
| 2007/0047506 A1* | 3/2007 | Froehling et al. | 370/338 |
| 2007/0086395 A1* | 4/2007 | Bakshi et al. | 370/338 |
| 2007/0091845 A1* | 4/2007 | Brideglall | 370/331 |
| 2007/0105567 A1* | 5/2007 | Mohanty et al. | 455/458 |

OTHER PUBLICATIONS

Yuvraj Agarwal et al., "Dynamic Power Management using on Demand Paging for Networked Embedded Systems," Design Automation Conference, 2005, Proceedings of the ASP-DAC 2005, Asia and South Pacific, Jan. 18-21, 2005, vol. 2, pp. 755-759.
Trevor Pering et al., "CoolSpots: Reducing the Power Consumption of Wireless Mobile Devices with Multiple Radio Interfaces," MobiSys '06, Jun. 19-22, 2006, Uppsala, Sweden.

* cited by examiner

*Primary Examiner*—Kamran Afshar
(74) *Attorney, Agent, or Firm*—Schwabe, Williamson & Wyatt, P.C.

(57) ABSTRACT

Embodiments of the present invention provide paging operations for idle mode terminals with a plurality of wireless interfaces. In accordance with an embodiment, a method includes selecting, by a paging controller, a radio for a paging operation, the radio being included on a mobile station comprising at least two radios. The method also includes performing, by the paging controller, at least one paging operation for at least one of the at least two radios, wherein if only one paging operation is performed for only one radio, the selected radio and the radio for which the one paging operation is performed are different radios. Other embodiments may be described and claimed.

11 Claims, 5 Drawing Sheets

PAGING OPERATION FOR IDLE MODE TERMINALS WITH A PLURALITY OF WIRELESS INTERFACES

TECHNICAL FIELD

Embodiments of the present invention relate to the field of heterogeneous wireless networks, and more particularly, to paging operation for idle mode terminals with a plurality of wireless interfaces.

BACKGROUND

Mobile Stations (MS) are powered on a wireless network for significant time durations, but are not always in an active call session. To use the times they are not in an active call session as battery conserving opportunities, idle mode and paging operations are defined in many of the mobile wireless network standards including, but not limited to, Wireless Fidelity (Wi-Fi) Alliance, Worldwide Interoperability for Microwave Access (WiMAX) Forum, Third Generation Partnership Project (3GPP). Per such defined operations, an MS enters a low-powered mode called idle mode and there are specified mechanisms in the various technologies to let the MS get back to active mode whenever required, e.g., when there is an incoming call for the MS, when the network needs to know the location of the MS, etc.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide paging operation for idle mode terminals with a plurality of wireless interfaces.

Figure 1:
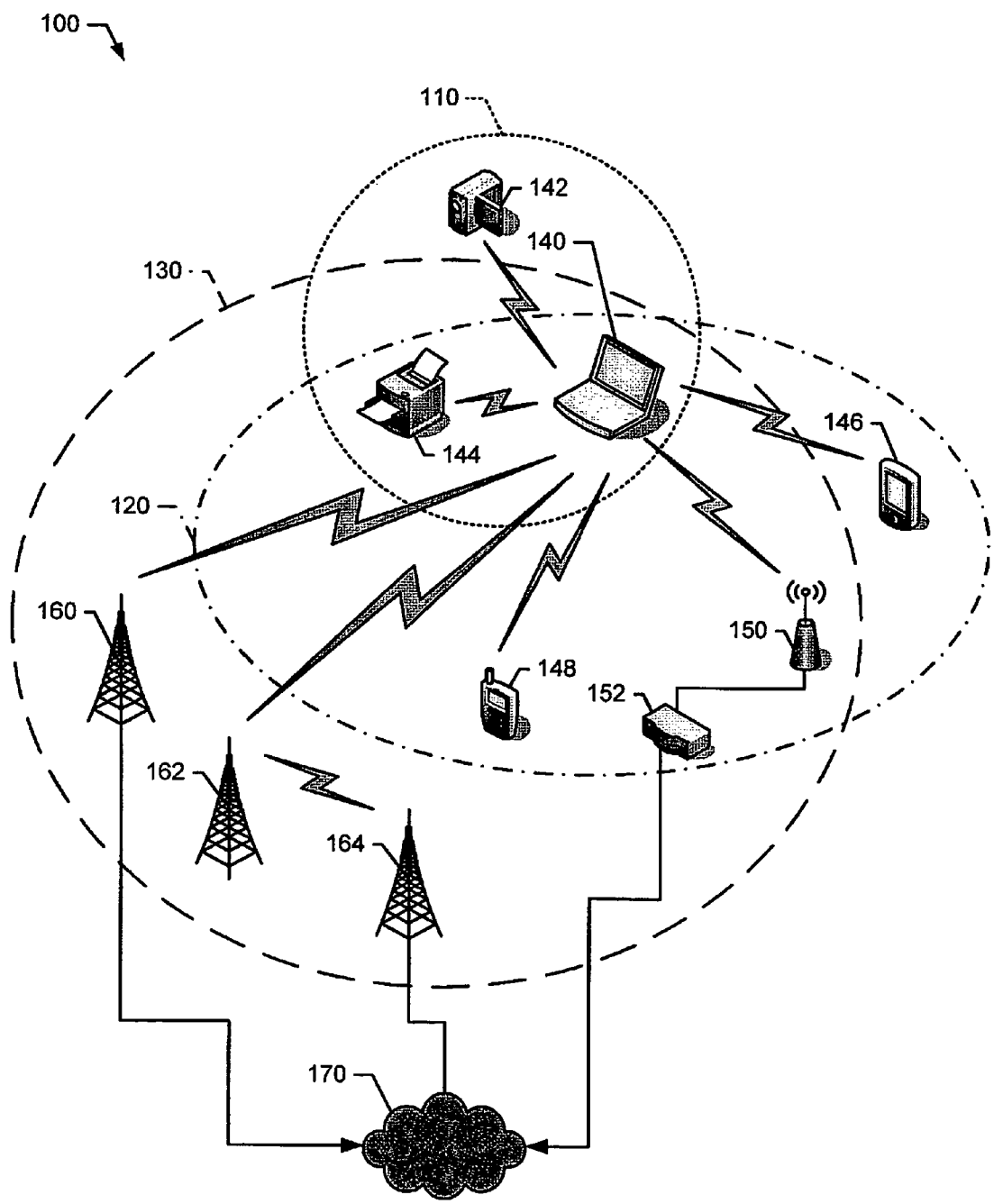
FIG. 1 is a schematic diagram representation of an example wireless communication system in accordance with various embodiments of the present invention.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication system 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five subscriber stations, the wireless communication system 100 may include more or less subscriber stations.

Each of the subscriber stations 140, 142, 144, 146, and 148 may be authorized or allowed to access services provided by one or more of the wireless communication networks 110, 120, and/or 130. The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation (e.g., orthogonal frequency-division multiple access (OFDMA)), multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004 (published Sep. 18, 2004), the IEEE std. 802.16e (published Feb. 28, 2006), the IEEE std. 802.16f (published Dec. 1, 2005), etc.) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, 3GPP technology, standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
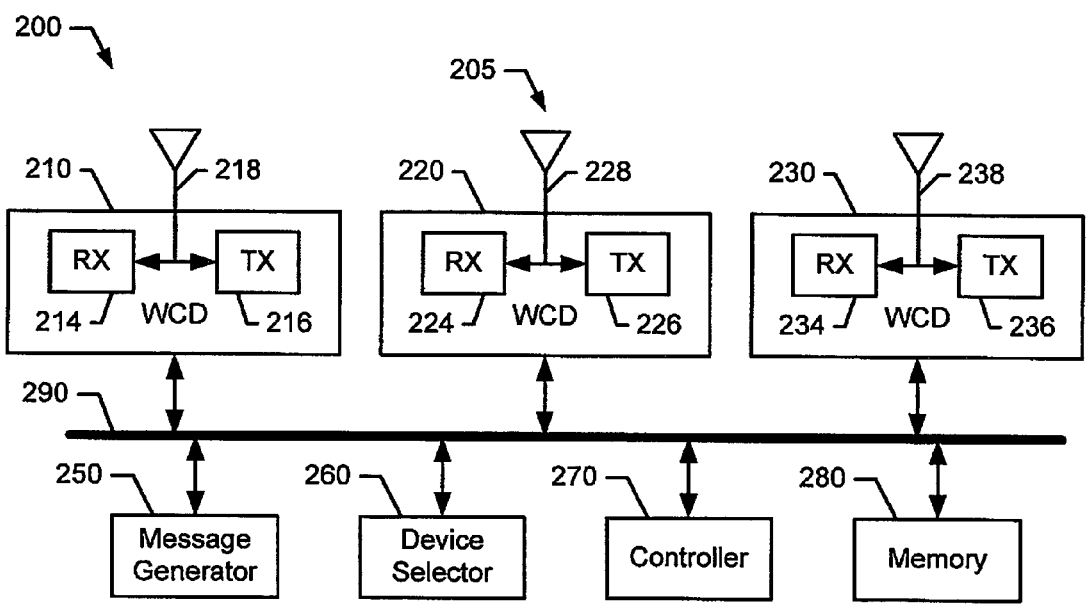
FIG. 2 is a block diagram representation of an example platform with multiple radios.

In the example of FIG. 2, a platform 200 may include a plurality of wireless communication devices or radios 205, generally shown as 210, 220, and 230. The platform 200 may be a part of and/or integrated into one of the wireless electronic devices mentioned above in connection with FIG. 1 or any combination thereof. For example, the platform 200 may also include a message generator 250, a device selector 260, a controller 270, and a memory 280. The plurality of radios 205, the device selector 250, the message generator 260, the controller 270, and the memory 280 may be operatively coupled to each other via a bus 290. While FIG. 2 depicts components of the platform 200 coupling to each other via the bus 290, these components may be operatively coupled to each other via other suitable direct or indirect connections (e.g., a point-to-point connection or a point-to-multiple point connection). Further, although FIG. 2 depicts three radios, the platform 200 may include more or less radios.

Each of the plurality of radios 205 may include a receiver (RX), generally shown as 214, 224, and 234, and a transmitter (TX), generally shown as 216, 226, and 236. Accordingly, each of the plurality of radios 205 may receive and/or transmit data via the receivers 214, 224, and 234 and the transmitters 216, 226, and 236, respectively. Each of the plurality of radios 205 may also include an antenna, generally shown as 218, 228, and 238. Each of the antennas 218, 228, and 238 may include one or more directional or omni-directional antennas such as dipole antennas, monopole antennas, patch antennas, loop antennas, microstrip antennas, and/or other types of antennas suitable for transmission of radio frequency (RF) signals. Although FIG. 2 depicts a single antenna associated with each of the plurality of radios 205, each of the plurality of radios 205 may include additional antennas. For example, each of the plurality of radios 205 may include a plurality of antennas to implement a multiple-input-multiple-output (MIMO) system.

Each of the plurality of radios 205 may be associated with a wireless communication network such as, for example, a WPAN, a WLAN, a WMAN, a WWAN, or a wireless mesh network. As noted above in connection with FIG. 1, each type of wireless communication network may operate based on a particular wireless communication technology. To illustrate the application of the plurality of radios 205 with heterogeneous wireless communication networks, the radio 210 may operate based on Wi-Fi technology, the radio 220 may operate based on WiMAX technology, and the radio 230 may operate based on Third Generation (3G) technology. Each of the plurality of radios 205 may be used to perform various applications based on a variety of factors such as quality of service (QoS), cost per bit, coverage area, mobility, etc. In one example, the radio 210 may be used for transmission control protocol (TCP) and/or web browsing, the radio 220 may be used for video streaming, and the radio 230 may be used for voice over Internet protocol (VoIP). Although the plurality of radios 205 is described above to operate in a particular manner, the plurality of radios 205 may be used to perform various applications.

Briefly, Wi-Fi technology may provide high-speed wireless connectivity within a range of a wireless access point (e.g., a hotspot) in different locations including homes, offices, cafes, hotels, airports, etc. In particular, Wi-Fi technology may allow a wireless device to connect to a local area network without physically plugging the wireless device into the network when the wireless device is within a range of a wireless access point (e.g., within 150 feet indoor or 300 feet outdoors). In one example, Wi-Fi technology may offer high-speed Internet access and/or Voice over Internet Protocol (VoIP) service connection to wireless devices. The 802.11 family of standards was developed by IEEE to provide for WLANs (e.g., the IEEE std. 802.11a published 1999, the IEEE std. 802.11b published 1999, the IEEE std. 802.11g published 2003, variations, and/or evolutions of these standards). The Wi-Fi Alliance facilitates the deployment of WLANs based on the 802.11 standards. In particular, the Wi-Fi Alliance ensures the compatibility and inter-operability of WLAN equipment. For convenience, the terms "802.11" and "Wi-Fi" may be used interchangeably throughout this disclosure to refer to the IEEE 802.11 suite of air interface standards.

WiMAX technology may provide last-mile broadband connectivity in a larger geographical area (e.g., hot zones than other wireless technology such as Wi-Fi technology. In particular, WiMAX technology may provide broadband or high-speed data connection to various geographical locations where wired transmission may be too costly, inconvenient, and/or unavailable. In one example, WiMAX technology may offer greater range and bandwidth to enable T1-type service to businesses and/or cable/digital subscriber line (DSL)-equivalent access to homes. The 802.16 family of standards was developed by IEEE to provide for fixed, portable, and/or mobile broadband wireless access networks (e.g., the IEEE std. 802.16-2004 published 2004, the IEEE std. 802.16e published 2006, the IEEE std. 802.16f published 2005, variations, and/or evolutions of these standards). The WiMAX Forum facilitates the deployment of broadband wireless access networks based on the IEEE 802.16 standards. In particular, the WiMAX Forum ensures the compatibility and inter-operability of broadband wireless equipment. For convenience, the terms "802.16" and "WiMAX" may be used interchangeably throughout this disclosure to refer to the IEEE 802.16 suite of air interface standards.

Third Generation technology may provide broad-range coverage for voice communications, data access, and/or Internet connectivity across wide geographic areas. In particular, 3G technology may provide great mobility for devices whose primary function is voice services with additional data applications as a complement to those services. For example, such devices may include cellular telephones that may also provide interactive video conferencing, or a handheld computers (or PDAs) that may provide full-playback DVD services. To provide such high-speed wireless communication services, the International Mobile Telecommunications (IMT-2000) family of standards was developed by the International Telecommunications Unit (e.g., W-CDMA, CDMA2000, etc.).

Although the above examples are described with respect to particular wireless communication technologies, the plurality of radios 205 may operate based on other suitable types of wireless communication technology. For example, one of the plurality of radios 205 may operate based on UWB technology instead or the plurality of radios 205 may include an additional radio that may operate based on UWB technology.

To reduce power consumption, bandwidth usage, processing resources, etc., one or more of the plurality of radios 205 may operate in idle mode. In particular, each of the plurality of radios 205 may be inactive but readily available to operate in active mode if necessary. Each of the plurality of radios 205 may monitor for a paging message from a corresponding node (e.g., an access point or a base station) via a paging channel. For example, the paging message may be indicative of an incoming communication such as a voice call, a text message, streaming media, etc. In response to receipt of the paging message, one or more of the plurality of radios 205 may receive the incoming communication. In addition or alternatively, an individual may manually select one or more of the plurality of radios 205 to operate in active mode instead of idle mode.

Instead of each of the plurality of radios 205 performing or executing separate processes to either enter into or exit from idle mode, the platform 200 may coordinate and process a single request for at least one of the plurality of radios 205 to either enter into or exit from idle mode as described in detail below. In particular, the message generator 250 may generate an idle mode message. For example, the idle mode message may include information associated with the plurality of radios 205 such as identification, idle duration, recent communication, and/or other suitable information of each of the plurality of radios 205. The idle mode message may be an idle mode entry request or an idle mode exit request. In particular, the message generator 250 may generate an idle mode entry request to initiate idle mode for at least one radio of the plurality of radio 205. The message generator 250 may generate an idle mode exit request for at least one radio of the plurality of communication devices 205 to exit from idle mode.

The device selector 260 may select one of the plurality of radios 205 to operate as a proxy to transmit the idle mode message from the message generator 250. In one example, the device selector 260 may select the radio that uses the lowest transmit power to transmit the idle mode message(s). In another example, the device selector 260 may also select the radio that is currently in active mode or the last radio to transmit. In yet another example, each of the plurality of radios 205 may take turns to transmit idle mode message(s) for a predefined time period in a round-robin manner. Alternatively, an individual may designate one of the plurality of radios 205 to transmit the idle mode message.

The controller 270 may operate at least one of the plurality of radios 205 in idle mode based on paging information of an idle mode entry response. In particular, the paging information may include paging cycle and/or paging offset for at least one of the plurality of radios 205. For example, the radio 220 may be awake for ten milliseconds (ms) every second to monitor for a paging message. The controller 270 may also establish a direct wireless communication link between one of the plurality of radios 205 and a corresponding node.

The memory 280 may store the idle mode information and/or the paging information associated with each of the plurality of radios 205. For example, the idle mode information may include information provided by the platform 200 such as identification information of each of the plurality of radios 205, and which one of the plurality of radios 205 was selected to transmit the idle mode message (i.e., proxy device). The idle mode information may also include a length of time that each of the plurality of radios 205 may have been operating in idle mode (i.e., idle duration). The paging information may include information from at least one paging controller for at least one of the plurality of radios 205 to operate in idle mode. As noted above, for example, the paging information may include information associated with paging cycle, paging offset, and/or other suitable information.

Although the components shown in FIG. 2 are depicted as separate blocks within the platform 200, the functions performed by some of these blocks may be integrated within a single semiconductor circuit or may be implemented using two or more separate integrated circuits. In one example, although the receiver 214 and the transmitter 216 are depicted as separate blocks within the radio 210, the receiver 214 may be integrated into the transmitter 216 (e.g., a transceiver). In another example, the message generator 250, device selector 260, and/or the controller 270 may integrated into a single component (e.g., a processor). The methods and apparatus described herein are not limited in this regard.

Since there are numerous types of wireless networks, in accordance with various embodiments of the present invention, as noted above, many wireless electronic devices or mobile stations (MS) include multiple radios, for example, a WiFi-WiMAX combo, a WiFi-3GG combo, a WiMAX-3GG combo, etc. and each technology generally has its own paging specification for the air interface and the access network.

In accordance with various embodiments of the present invention, when data packets arrive for an MS in an idle mode, the network attempts to locate the MS through paging. It is assumed that all data packets destined for the MS first reach the MS's home agent. The home agent forwards the packets to the appropriate foreign agent using a mobile internet protocol address binding that is present in its database. Once the foreign agent receives the data packets for an idle mode MS, it determines an anchor paging controller (PC) for the MS and informs the anchor PC about the incoming data for the idle mode MS. The anchor PC then tries to locate this idle mode MS through paging operations.

In accordance with various embodiments of the present invention, instead of tracking the exact location of an idle mode MS at all times, the wireless technologies generally provide procedures to keep track of its approximate location, often designated by a Paging Group (PG), also, known as a tracking area or a location area. Typically, a PG comprises a cluster of one or more base stations and/or access points that are administered by a paging controller. The network only maintains the current PG of an idle mode MS. When in idle mode, if the MS moves away from its current PG and enters a new PG, its location information is updated. This procedure is also referred to as a location update. In this manner, the network keeps track of the location information of the idle mode MSs to the accuracy of a last known Paging Group. The network uses the approximate location information of an idle mode MS to locate and set up new connections with it. Whenever required, the MS is precisely tracked to its associated base station by sending a broadcast message within all base stations that comprise the MSs current PG.

In accordance with various embodiments of the present invention, the anchor PC may issue a paging announce message to the PG associated with a relay PC where the MS last performed a location update (via other relay PCs) and this relay PC may in turn broadcast it to the base stations in the appropriate PG. The base station knows the precise time intervals for which the idle mode MS will be listening to any broadcast messages (this information may be communicated via a paging announce message from the anchor PC) and transmits the paging announce on the air link only during these time intervals. In such a scenario, the MS is expected to hear the paging message from one of the base stations in the PG, and establish connectivity to the base station from which it hears the paging announce message.

Paging often occurs simultaneously for the MS at several base stations. Hence, the MS may consume a large amount of radio resources. In accordance with the various embodiments of the present invention, paging operations are aggregated, or completely eliminated.

Figure 3:
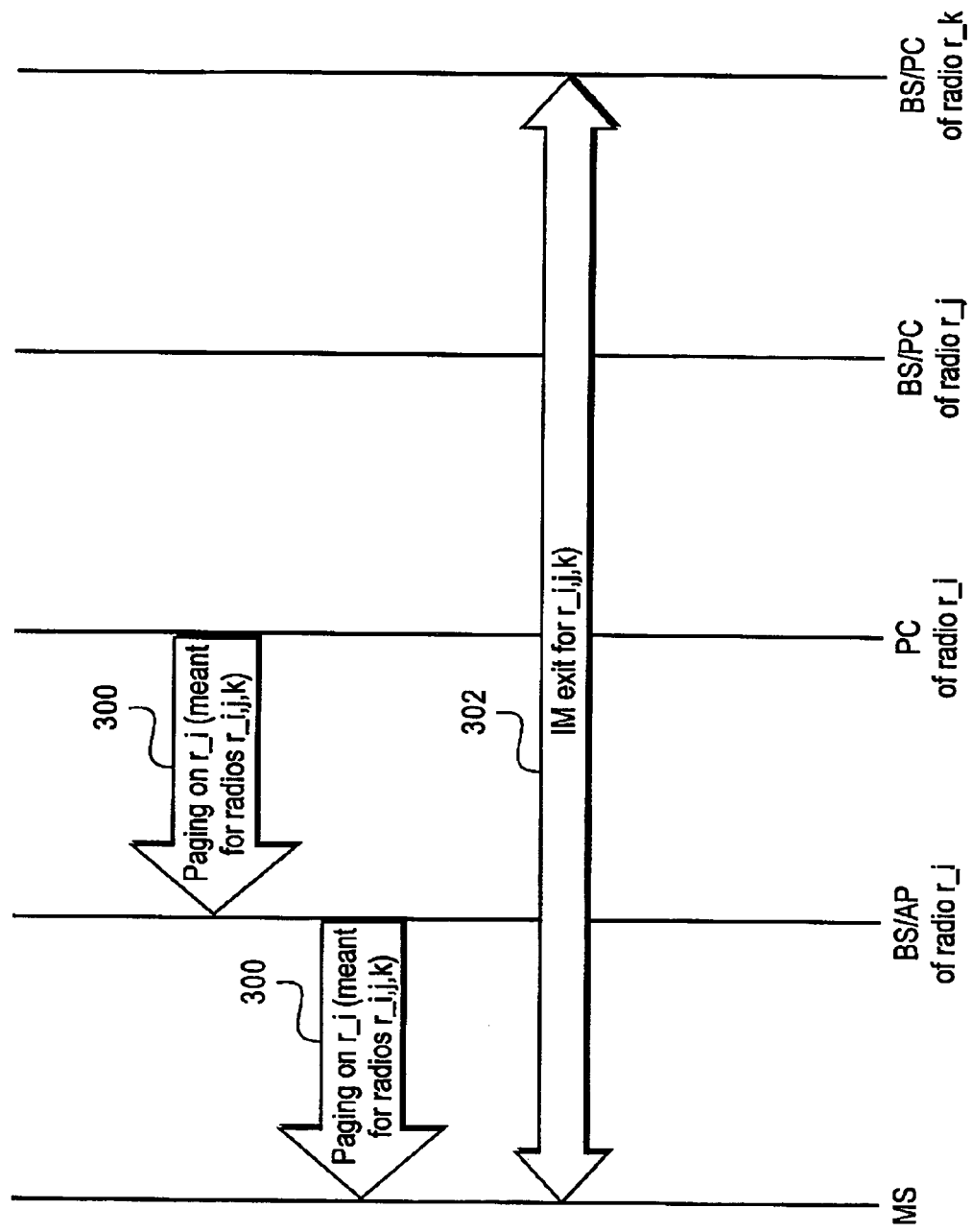
FIG. 3 is a schematic diagram representation of a paging operation in accordance with various embodiments of the present invention.

Referring to FIG. 3, in accordance with various embodiments of the present invention, a mobile station is idle with respect to all of its radios. It is assumed that the mobile station needs to be paged by applications within the network but need to operate on a subset of the mobile stations' radios. In such a scenario, only one radio, for example, radio r_i, is used to page the mobile station as opposed to paging the mobile station on all of its radios that need to be put back into a connected mode. Radio r_i may be chosen based upon various factors, including, for example, the cost of sending a message on this radio, the availability of the radio, the quality of service offered, etc.

Once a radio, in this example radio r_i, is chosen, the mobile station may be paged on this radio by the corresponding paging controller and base station. Thus, as may be seen in FIG. 3, a paging message 300 on radio r_i is forwarded to a base station or access point of radio r_i and is then forwarded on to the mobile station. The paging message indicates that the radios for radio r_i, radio r_j, and radio r_k should exit the idle mode. Thus, the mobile station will exit the idle mode on the three radios, as depicted by 302, and enter the connected mode for the three radios. Fewer or more radios may be handled in this manner, as desired.

Figure 4:
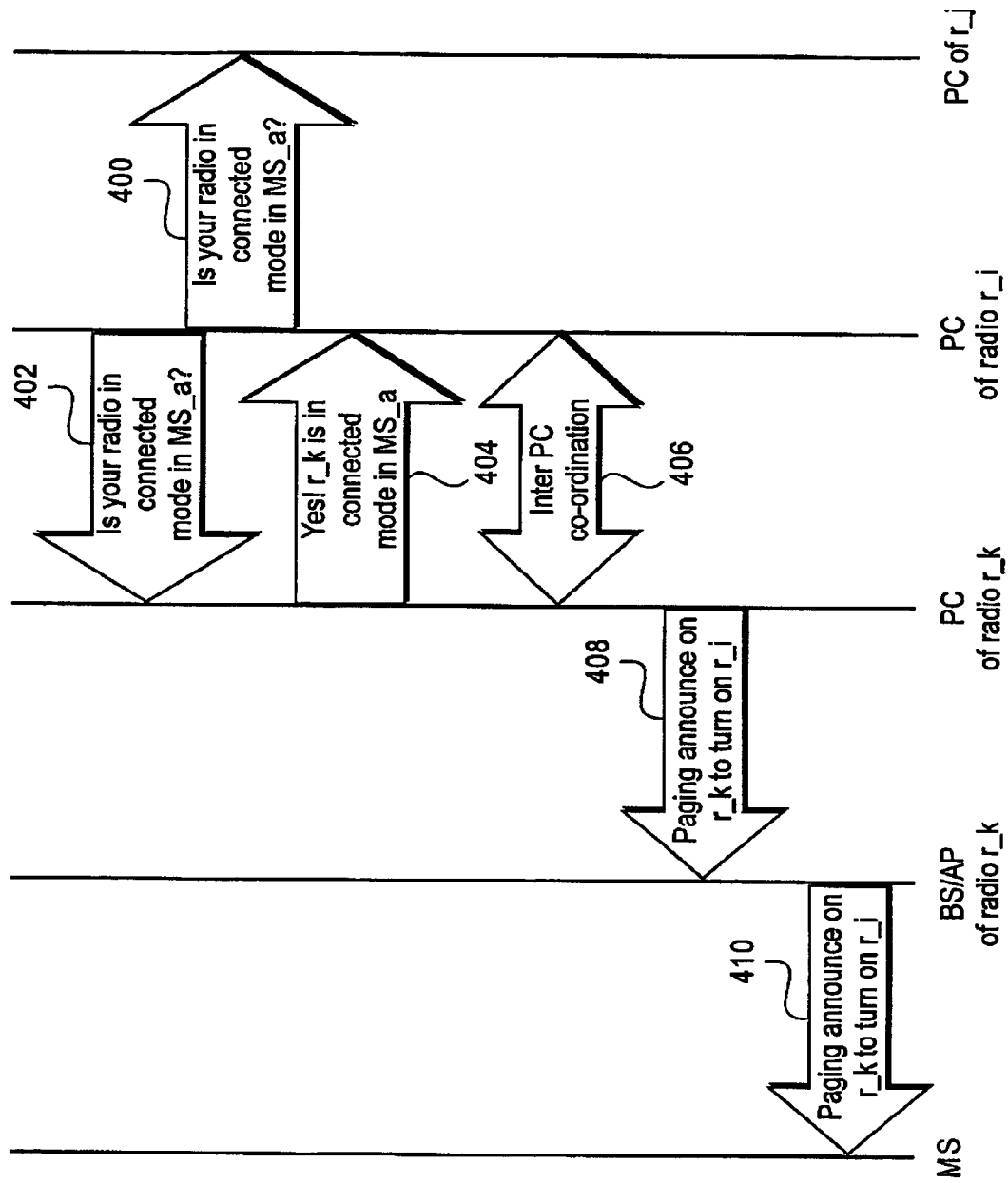
FIG. 4 is a schematic diagram representation of a paging operation in accordance with various embodiments of the present invention.

Referring to FIG. 4, in accordance with various embodiments of the present invention, an example for paging is illustrated wherein the mobile station is in a connected mode in a subset of radios r_1, . . . r_n. A radio needs to be paged by an application in the network that currently isn't in a connected mode. For example, the radio may be radio r_i.

In such an example, a traditional approach is to page the mobile station on radio r_i. However, in accordance with various embodiments of the present invention, the paging controller of radio r_i maintains a list of radios present on the particular mobile station to be paged and when needing to page the particular mobile station, it communicates with the paging controllers of the other radios that are present on the particular mobile station. Thus, the paging controller of radio_i sends messages 400, 402 to the paging controller of radio_j and radio_k, respectively, (more or fewer radios may be on the mobile station) inquiring as to whether or not their corresponding radios on the mobile station are in a connected mode. In this example, radio r_k indicates that its radio in the mobile station is in a connected mode through message 404. Radio r_j may or may not respond that its radio is not in a connected mode. The paging controller of radio r_i thus sends its paging message to the paging controller of radio r_k through Inter PC co-ordination message 406, which forwards the paging announce message 408 to a base station or access point of radio r_k. A paging announce message 410 may then be forwarded on to the mobile station via its radio r_k informing it to turn on its radio that corresponds to radio r_i. In accordance with various embodiments of the present invention, the mobile station may send a paging response message to the paging controller of radio r_i, either through its base station or access point, or directly. In accordance with various embodiments of the present invention, the mobile station may also send such a response to the paging controller of radio r_k so that it knows that the mobile station is now in a connected mode with respect to radio r_i.

In accordance with various embodiments of the present invention, for the arrangements illustrated in both FIGS. 3 and 4, policies may be set within a network in such a way that a mobile station will always be paged on a particular radio in the event that a plurality of the radios of a mobile station are in an idle mode.

Figure 5:
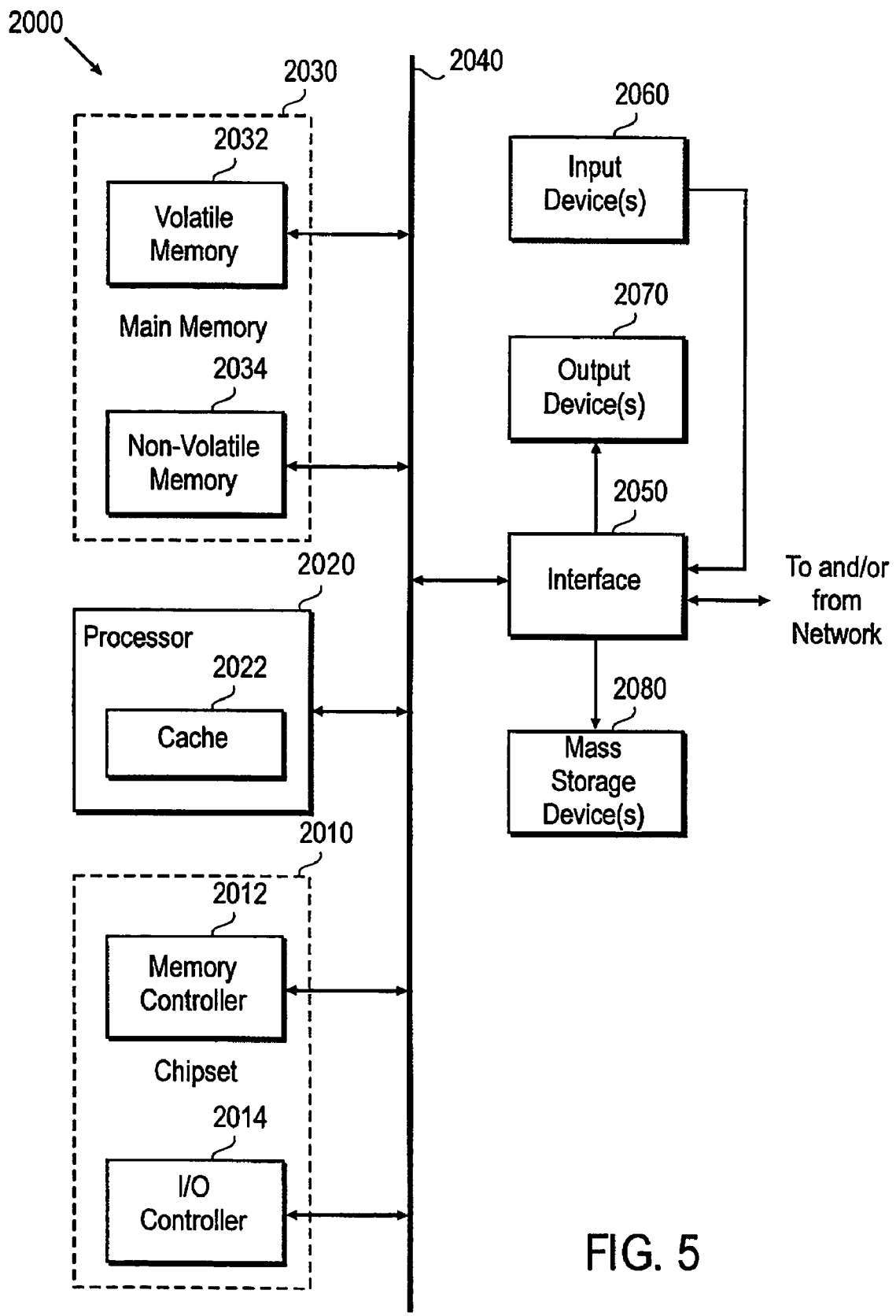
FIG. 5 is a block diagram representation of an example processor system that may be used to practice various aspects of the present invention.

FIG. 5 is a block diagram of an example processor system 2000 adapted to implement the methods and apparatus disclosed herein, in accordance with various embodiments. The processor system 2000 may be a desktop computer, a laptop computer, a handheld computer, a tablet computer, a PDA, a server, an Internet appliance, and/or any other type of computing device. The processor system 2000 may be used as a STA, a base station, an AP, or a server hosting the paging controller function.

The processor system 2000 illustrated in FIG. 5 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The chipset 2010 may be implemented using one or more Wireless Personal Area Network (WPAN) components, Wireless Local Area Network (WLAN) components, Wireless Metropolitan Area Network (WMAN) components, Wireless Wide Area Network (WWAN) components, and/or other suitable networking components. In particular, in various embodiments designed to be a STA or a paging service, the chipset 2010 may be endowed with the teachings of the present invention, implementing selected aspects of the above described paging mechanism. The processor 2020 may be implemented using one or more processors, e.g. those of the Intel® Core™ technology, Intel® Pentium® technology, the Intel® Itanium® technology, the Intel® Centrino™ technology, the Intel® Core™ Duo technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device. In various embodiments designed to be used as a server, suitable for hosting the above described paging service function, main memory 2030 may include (a non-persistent copy of the) instructions implementing all or portions of the above described paging controller function.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, a WiFi interface, a WiMax interface and/or any other suitable type of interface. In various embodiments designed to be a STA or AP, selected aspects of the above described paging mechanism may be implemented in interface circuit 2050, in addition to or in lieu of the endowment in chipset 2010.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives. In various embodiments designed to be used as a server, suitable for hosting the above described paging service function, mass storage device(s) may include (a non-persistent copy of the) instructions implementing all or portions of the above described paging controller function.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 5 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   selecting, by a paging controller, a radio for a paging operation, the radio being included on a mobile station comprising at least two radios;
   determining, by the paging controller, if any of the at least two radios are in a connected mode; and
   performing, by the paging controller, at least one paging operation for at least one of the at least two radios, wherein if only one paging operation is performed for only one radio, the selected radio and the radio for which the one paging operation is performed are different radios;
   wherein selecting a radio comprises:
   selecting one of the at least two radios that is in a connected mode, if any are in a connected mode, and if more than one of the at least two radios is in a connected mode, selecting one of the at least two radios in a connected mode based upon at least one predetermined factor; and
   selecting one of the at least two radios based upon at least one predetermined factor if none of the at least two radios are in a connected mode.

2. The method of claim 1, wherein performing a paging operation comprises performing a paging operation for at least one other of the at least two radios that is in an idle mode.

3. The method of claim 1, wherein performing a paging operation comprises performing a paging operation for at least one other of the at least two radios that is in a connected mode.

4. The method of claim 1, wherein performing a paging operation comprises performing a paging operation for the selected radio and performing a paging operation for at least one other of the at least two radios that is in an idle mode.

5. The method of claim 1, wherein the at least one predetermined factor comprises which radio uses the lowest transmit power.

6. The method of claim 1, wherein the at least one predetermined factor comprises which radio was the last radio to transmit.

7. The method of claim 1, wherein the at least one predetermined factor comprises each radio taking turns for a predefined time period in a round-robin manner.

8. The method of claim 1, wherein the at least one predetermined factor comprises an individual designating a radio.

9. The method of claim 1, wherein the at least one predetermined factor comprises a cost of sending a message on a radio.

10. The method of claim 1, wherein the at least one predetermined factor comprises availability of a radio.

11. The method of claim 1, wherein the at least one predetermined factor comprises quality of service offered.

* * * * *